United States Patent
Huang

(10) Patent No.: US 11,296,792 B1
(45) Date of Patent: Apr. 5, 2022

(54) OPTICAL TRANSCEIVER IN TRANSISTOR OUTLINE PACKAGE

(71) Applicant: SHUNYUN TECHNOLOGY (ZHONG SHAN) LIMITED, Zhongshan (CN)

(72) Inventor: Jie Huang, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 17/237,644

(22) Filed: Apr. 22, 2021

(30) Foreign Application Priority Data

Apr. 1, 2021 (CN) .......................... 202110356359.2

(51) Int. Cl.
| | |
|---|---|
| *H04B 10/00* | (2013.01) |
| *H04B 10/40* | (2013.01) |
| *H04B 10/572* | (2013.01) |
| *G02B 6/42* | (2006.01) |

(52) U.S. Cl.
CPC .......... *H04B 10/40* (2013.01); *G02B 6/4214* (2013.01); *G02B 6/4246* (2013.01); *H04B 10/572* (2013.01)

(58) Field of Classification Search
CPC .. G02B 6/4263; G02B 6/4214; G02B 6/4246; H04B 10/40; H04B 10/572; H01S 5/02212; H01S 5/02208; H01S 5/141; G01J 1/0271; G01J 1/0403; G01J 1/0407; G01J 1/0488; G01J 1/4228; G01J 9/0246
See application file for complete search history.

(56) References Cited

U.S. PATENT DOCUMENTS

| | | | | |
|---|---|---|---|---|
| 2007/0146881 | A1* | 6/2007 | Tanaka | H04B 10/40 359/485.06 |
| 2010/0086262 | A1* | 4/2010 | Kihara | G02B 6/4214 385/89 |
| 2010/0226651 | A1* | 9/2010 | Hung | G02B 6/4246 398/79 |
| 2016/0223393 | A1* | 8/2016 | Hsu | G01J 1/0271 |

FOREIGN PATENT DOCUMENTS

CN  109075874 A  12/2018

* cited by examiner

*Primary Examiner* — David C Payne
*Assistant Examiner* — Pranesh K Barua
(74) *Attorney, Agent, or Firm* — ScienBiziP, P.C.

(57) ABSTRACT

An optical signal transceiver in a transistor outline package includes a component base, a laser device, a first wavelength division multiplexing prism and a second wavelength division multiplexing prism, a first photodetector, and a second photodetector. The component base is inside the transistor outline package and supports the laser device, the laser device emitting light to the outside of the transistor outline package. The first and second prisms and the first photodetector and the second photodetector are also located on the component base. Light output as optical signals sequentially pass through the first and second multiplexing prisms. The first input optical signal is transmitted to the first photodetector through the first prism, and the second input optical signal passes through the first prism and is passed on to the second photodetector via the second prism.

13 Claims, 3 Drawing Sheets

OPTICAL TRANSCEIVER IN TRANSISTOR OUTLINE PACKAGE

FIELD

The subject matter herein generally relates to optical communications.

BACKGROUND

Optical transceivers transmit and receive light as optical signals for various applications. Optical transceivers provide higher speeds and bandwidth over longer distances, for example, as compared to transmission over copper cables. Higher speed in smaller optical transceiver modules is always a goal for lower cost, as long as optical efficiency, thermal management, insertion loss reduction, and manufacturing yield can be maintained or improved.

Optical transceiver modules can include one or more transmitter optical subassemblies (TOSAs) and receiver optical subassemblies (ROSAs). Conventional optical transceiver modules require three independent transistor outline package components. Each transistor outline package component needs to be individually mounted, gold wire-bonded and hermetically packaged, etc., and must be optically coupled with a filter separately, increasing assembly complexity and affecting product yield and production volume. There is room for improvement within the art.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
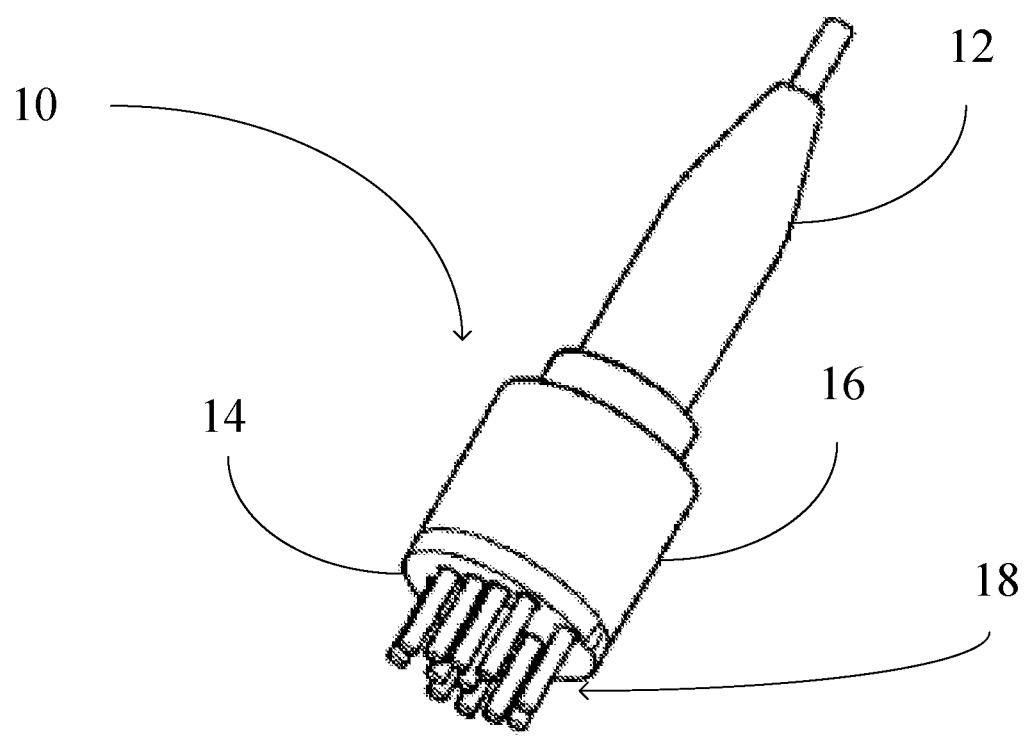
FIG. 1 is a perspective view of an optical transceiver disclosed in one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an optical transceiver according to an embodiment of the disclosure. The optical sensor 10 is connected to an optical fiber terminal 12. The optical fiber terminal 12 aligns the optical transmission axis between the optical sensor 10 and the optical fiber. The optical transceiver 10 comprises a transistor outline (TO) package. The transistor outline package comprises a transistor outline header 14 and a transistor outline cap 16. The transistor outline header 14 and the transistor outline cap 16 are assembled together and form an internal closed space. In addition, electrical conductor pins 18 pass through the transistor outline header 14 for electrically connecting to other circuit elements.

Figure 2:
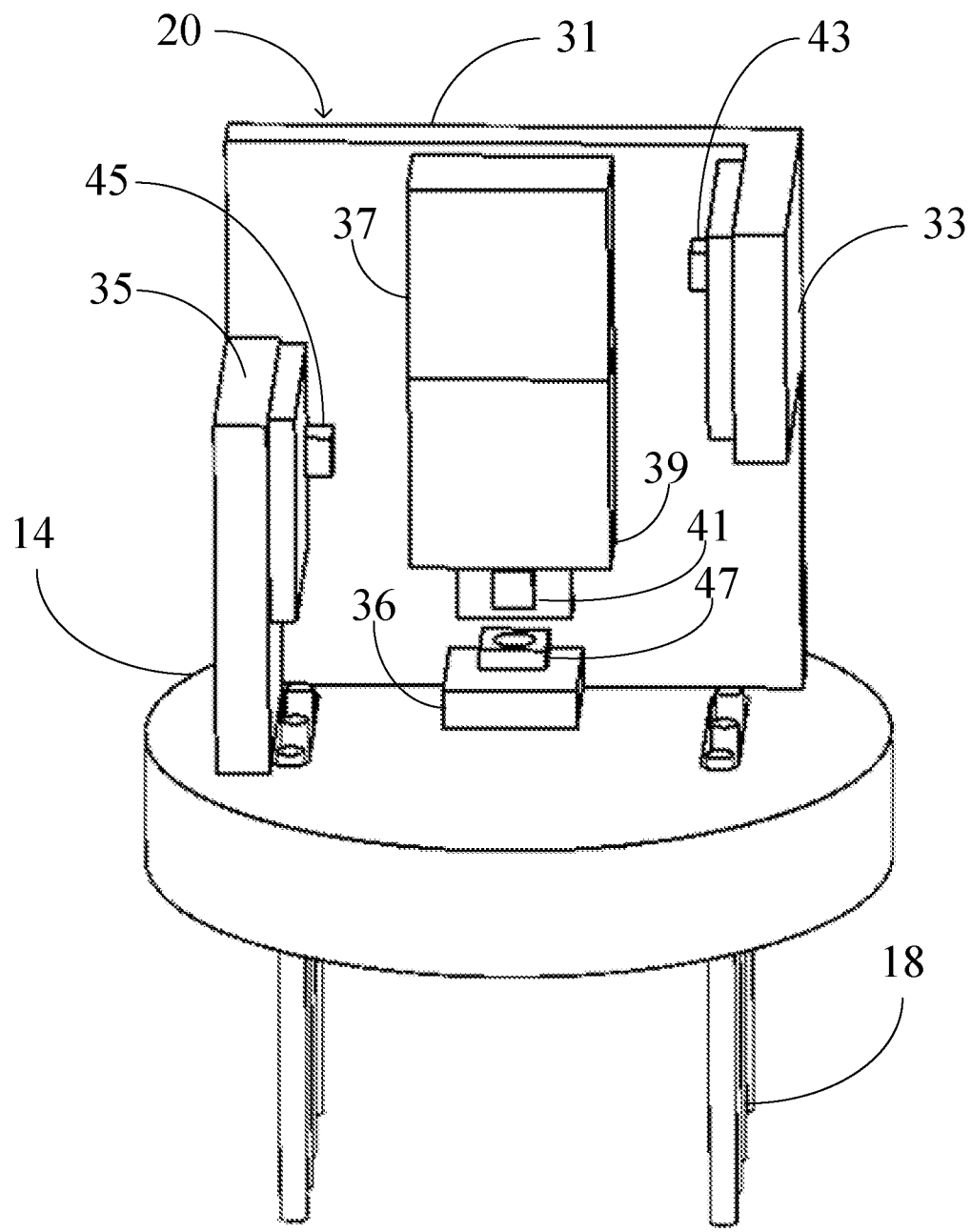
FIG. 2 is a perspective view of the optical transceiver of FIG. 1, the transistor outline cap being removed.

FIG. 2 illustrates the optical transceiver of FIG. 1, the transistor outline cap 16 being removed. The optical transceiver 10 comprises a component base 20. The component base 20 is disposed in the internal space in the transistor outline package formed by the transistor outline header 14 and the transistor outline cap 16, and is disposed on the transistor outline header 14. According to an embodiment of the disclosure, the component base 20 and the transistor outline header 14 are independent components, and the component base 20 can be pasted on the transistor outline header 14. According to another embodiment of the disclosure, the component base 20 and the transistor outline header 14 can be integrated into one component to improve the assembly efficiency.

The component base 20 comprises a substrate 31, a first support base 33, a second support base 35, and a third support base 36. The first support base 33 is disposed on one side of the substrate 31 and the second support base 35 is disposed on the other side of the substrate 31. According to an embodiment of the disclosure, the substrate 31, the first support base 33, the second support base 35, and the third support base 36 may be an integrally formed structure made of the same material, such as metal or plastic. In other embodiments, the component base 20 can also comprise the substrate 31, the first support base 33, the second support base 35, and the third support base 36.

The substrate 31, the first support base 33, the second support base 35, and the third support base 36 each have a surface for placement of components. The component placement surfaces of the first support base 33 and the second support base 35 are parallel to each other, and orthogonal to the component placement surface of the third support base 36. The component placement surfaces of the first support base 33, the second support base 35, and the third support base 36 are orthogonal to the component placement surface of the substrate 31. Specifically, the first support base 33, the second support base 35, and the third support base 36 respectively extend in a direction away from the substrate 31.

A first wavelength division multiplexing prism 37, a second wavelength division multiplexing prism 39, and a laser device 41 are disposed on the component placement surface of the substrate 31. The first photodetector 43 is disposed on the first support base 33, and the second photodetector 45 is disposed on the second support base 35. The monitor photodetector 47 is disposed on the third support base 36. According to an embodiment of the disclosure, the monitor photodetector 47, the laser device 41, the first wavelength division multiplexing prism 37, and the second wavelength division multiplexing prism 39 are located on a common axis, the first photodetector 43 and the second photodetector 45 being on both sides away from the common axis. In another embodiment, the first photodetector 43 and the second photodetector 45 are located on the same side of the common axis. In order to safeguard the line of the optical path, the distances between the first photodetector 43 and the second photodetector 45 relative to the transistor outline header 14 must be different. In addition, the first wavelength division multiplexing prism 37 and the second wavelength division multiplexing prism 39 may be two independent elements, or may be integrated into a single prism.

Figure 3:
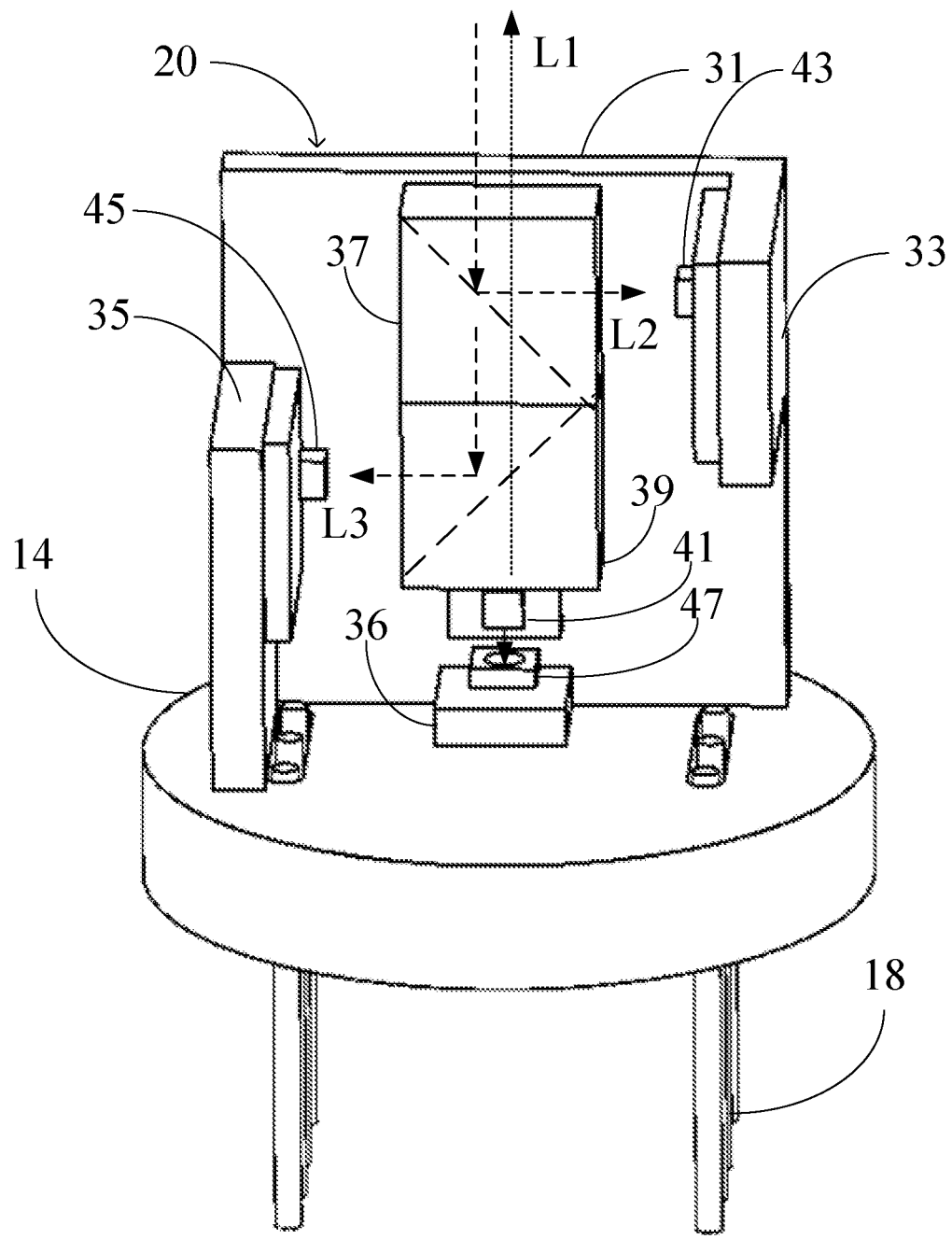
FIG. 3 is a perspective view of the optical transceiver of FIG. 2, a description of the optical paths being added.

FIG. 3 illustrates the optical transceiver of FIG. 2, where optical paths are illustrated. The optical transceiver according to an embodiment of the disclosure is based on the fiber-to-the-home (FTTH) technical solution of Ethernet Passive Optical Network (EPON) and Gigabit Passive Optical Network (GPON), and uses 1310 nm, 1490 nm, and 1550 nm three-wavelength distribution solutions. The light (signal) wavelength of 1490 nm is used for the download of voice, data, and IP video signals, the wavelength of 1550 nm is used for the download of analog video signals, and the wavelength of 1310 nm is used for the upload of data and IP video signals. In FIG. 3, the optical elements are seen mounted on the component placement surface of the element holder 20, and the optical elements include a laser device 41, a first photodetector 43, and a second photodetector 45. The laser device 41 is a light source. In optical communication systems, light-emitting diodes or laser diodes are usually used as light sources. In the instant disclosure, the laser device 41 can comprise one or multiple vertical cavity surface emitting laser diodes (hereinafter referred to as VCSELs). The VCSELs form an array to emit light in form of signals. In other embodiments, the light source can be light emitting diodes, edge emitting laser diodes (EELD), or distributed feedback lasers (DFB). In an embodiment of the disclosure, the laser device 41 is a distributed feedback laser diode (DFB), which emits light beams L1 with wavelength of 1310 nm.

The first photodetector 43 and the second photodetector 45 convert the sensed optical signal into electrical signals. The types of photodetectors can include PN photodiodes, PIN photodiodes, and avalanche photodiodes. According to an embodiment of the disclosure, the first photodetector 43 can be an avalanche photodiode for detecting input light signal L2 and the second photodetector 45 can be a PIN diode for detecting the input optical signal L3. The wavelength of the input optical signal L2 is 1490 nm and the wavelength of the input optical signal L3 is 1550 nm. According to an embodiment of the disclosure, a monitor photodetector 47 is provided for monitoring the operation of the laser device 41, such as the output power of the optical signal L1.

The first wavelength division multiplexing prism 37 and the second wavelength division multiplexing prism 39 can reflect or transmit light in a specific wavelength range. As shown in FIG. 3, the output optical signal L1 emitted by the laser device 41 is emitted along the direction parallel to the component placement surface of the substrate 31. According to an embodiment of the disclosure, the output optical signal L1 has a wavelength of 1310 nm, able to pass through the second wavelength division multiplexing prism 39 and the first wavelength division multiplexing prism 37, and then be transmitted to the fiber outside the optical transceiver 10.

The first wavelength division multiplexing prism 37 can transmit the input optical signal L3 with a wavelength of 1550 nm, but reflects to the first photodetector 43 the input optical signal L2 with a wavelength of 1490 nm. The second wavelength division multiplexing prism 39 reflects to the second photodetector 45 the input optical signal L3 with a wavelength of 1550 nm. The configuration of the first wavelength division multiplexing prism 37 and the second wavelength division multiplexing prism 39 allows the output light signal L1 emitted by the laser device 41 to be sequentially transmitted to the optical fiber outside the optical transceiver 10 through the second wavelength division multiplexing prism 39 and the first wavelength division multiplexing prism 37. The input optical signal L2 is reflected to the first photodetector 43 via the first wavelength division multiplexer 37, and the input optical signal L3 passes through the first wavelength division multiplexing prism 37, and is reflected to the second photodetector 45 via the second wavelength division multiplexing prism 39.

The laser device 41, the first photodetector 43, the second photodetector 45, and the monitor photodetector 47 are also electrically connected to the electrical conductor pin 18 through gold wire bonding. The optical transceiver according to the disclosure may include drivers for driving the laser device 41 and other circuit elements necessary to implement the optical signal transmission function, and may also include a control circuit. These designs are well known to those skilled in the art, and will not be repeated here.

According to the embodiments of the disclosure, the laser device and two photodetectors with different wavelengths are mounted in a single transistor outline package (such as a TO85 device), which reduces the material of the transistor outline header and the transistor outline cap, and reduces the number of hermetically sealed transistor outline headers with transistor outline caps, and also reduces the number of optical couplings. Therefore, the complexity of the assembly process is reduced, and yield and output of the product are improved.

Many details are found in the relevant art and thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. An optical transceiver, comprising:
   a component base comprising a substrate, a first support base disposed on one side of the substrate, and a second support base disposed on the other side of the substrate;
   a transistor outline package, comprising:
      a transistor outline header for disposing the component base; and a transistor outline cap connected to the transistor outline header, and forming an internal space with the transistor outline header to receive the component base;

a laser device disposed on the component base, wherein the laser device is configured to emit an output optical signal toward an outside of the transistor outline package;

a first wavelength division multiplexing prism and a second wavelength division multiplexing prism each disposed on the component base;

a first photodetector and a second photodetector each disposed on the component base, wherein the output optical signal passes through the first wavelength division multiplexing prism and the second wavelength division multiplexing prism, a first input optical signal is transmitted to the first photodetector through the first wavelength division multiplexing prism, and a second input optical signal passes through the first wavelength division multiplexing prism and is transmitted to the second photodetector via the second wavelength division multiplexing prism, wherein the first wavelength division multiplexing prism and the second wavelength division multiplexing prism are each disposed on the substrate, the first photodetector is disposed on the first support base, the second photodetector is disposed on the second support base, and a distance between the first photodetector and the transistor outline header is different from a distance between the second photodetector and the transistor outline header.

2. The optical transceiver of claim 1, wherein the component base further comprises a third support base disposed on the substrate between the first support base and the second support base, and a monitor photodetector is disposed on the third support base.

3. The optical transceiver of claim 2, wherein the substrate, the first support base, the second support base, and the third support base are integrally formed.

4. The optical transceiver of claim 1, wherein the component base and the transistor outline header are integrally formed.

5. The optical transceiver of claim 1, wherein the first photodetector is an avalanche photodiode, the second photodetector is a PIN photodiode.

6. The optical transceiver of claim 1, wherein the laser device, the first wavelength division multiplexing prism, and the second wavelength division multiplexing prism are co-axially arranged on a common axis, and the common axis is between the first photodetector and the second photodetector.

7. An optical transceiver, comprising:
a transistor outline package;
a component base disposed in transistor outline package, comprising a substrate, a first support base disposed on one side of the substrate, a second support base disposed on the other side of the substrate, and a third support base disposed on the substrate between the first support base and the second support base, wherein a monitor photodetector is disposed on the third support base;

a laser device disposed on the substrate, wherein the laser device emits an output optical signal toward an outside of the transistor outline package;

a first wavelength division multiplexing prism and a second wavelength division multiplexing prism disposed on the substrate;

a first photodetector disposed on the first support base; and a second photodetector disposed on the second support base, wherein the output optical signal passes through the first wavelength division multiplexing prism and the second wavelength division multiplexing prism, a first input optical signal is transmitted to the first photodetector through the first wavelength division multiplexing prism, and a second input optical signal passes through the first wavelength division multiplexing prism and is transmitted to the second photodetector via the second wavelength division multiplexing prism.

8. The optical transceiver of claim 7, wherein the transistor outline package comprises:
a transistor outline header for disposing the component base; and
a transistor outline cap connected to the transistor outline header, and forming an internal space with the transistor outline header to receive the component base.

9. The optical transceiver of claim 8, wherein a distance between the first photodetector and the transistor outline header is different with that between the second photodetector and the transistor outline header.

10. The optical transceiver of claim 8, wherein the component base and the transistor outline header are integrally formed.

11. The optical transceiver of claim 7, wherein the substrate, the first support base, the second support base, and the third support base are integrally formed.

12. The optical transceiver of claim 7, wherein the first photodetector is an avalanche photodiode, the second photodetector is a PIN photodiode.

13. The optical transceiver of claim 7, wherein the laser device, the first wavelength division multiplexing prism, and the second wavelength division multiplexing prism are located on a common axis, and the common axis is between the first photodetector and the second photodetector.

\* \* \* \* \*